June 16, 1931.  M. C. PIERCE  1,810,726
VEHICLE SUPPORT
Filed Jan. 12, 1929
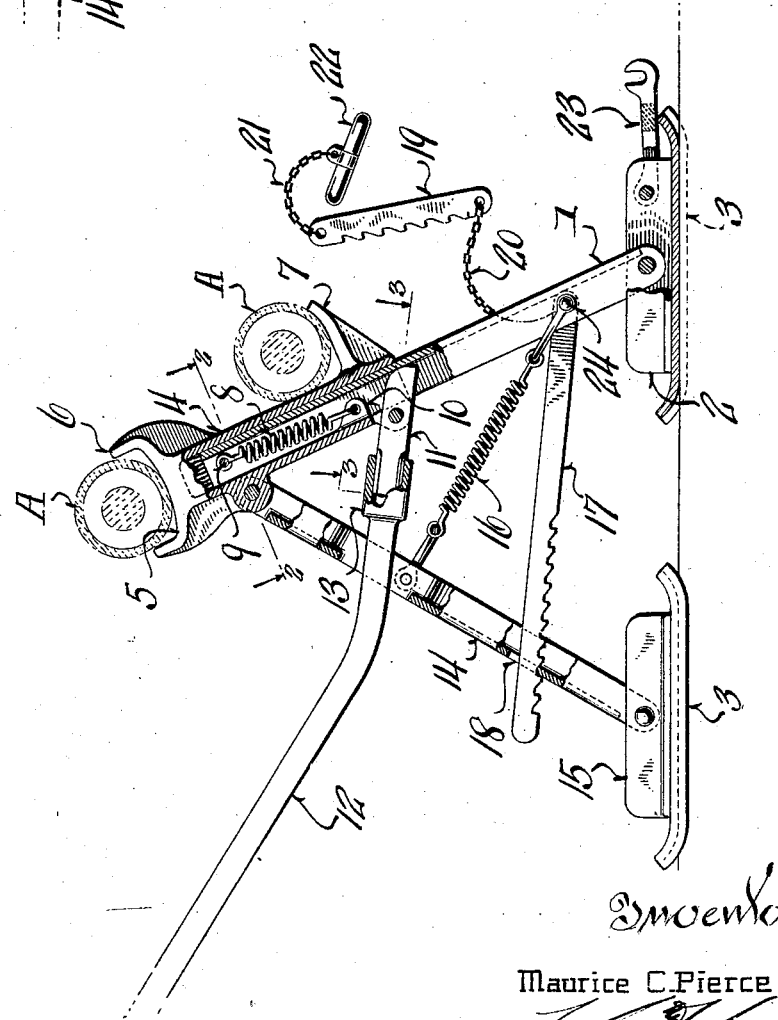

Patented June 16, 1931

1,810,726

UNITED STATES PATENT OFFICE

MAURICE CAMPBELL PIERCE, OF MADISON, WISCONSIN

VEHICLE SUPPORT

Application filed January 12, 1929. Serial No. 331,996.

This invention pertains to vehicle supports designed primarily for use in connection with lifting jacks of the general type disclosed in United States Letters Patent No. 1,650,536, issued on November 22, 1927, wherein the vehicle is raised to a predetermined height by driving the same upon the jack after which the load of the vehicle is transferred to a suitable support.

The present invention has primarily for its object the provision of an improved support for receiving the axle or other portion of a vehicle, which may be either automatically or manually adjusted to the desired height, and which may be collapsed for compact storage.

Incidental to the foregoing, a more specific object resides in the provision of a support comprising a pair of telescoping members, adapted to adjust themselves to the desired height of the object to be supported, and provided with means for locking them in adjusted position.

A still further object resides in the provision of a support comprising a pair of hinged standards provided with ground engaging shoes, and means for urging the standards together to automatically adjust the support to the desired height.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is an elevation of a support constructed in accordance with the present invention, parts being broken away and in section to more clearly illustrate the structural details;

Figure 2 is a transverse section taken on the line 2—2 of Figure 1; and

Figure 3 is a similar section taken on the line 3—3 of Figure 1.

Referring now more particularly to the accompanying drawings, the numeral 1 designates a standard which is preferably of channel form and has pivoted to its lower end a ground engaging shoe 2 provided with upturned ends to permit the same to slide upon the ground, and longitudinal runners 3 adjacent its edges to prevent side slippage.

Slidably mounted on the upper end of the standard 1 is a vehicle supporting member 4 which receives the axle or other convenient portion of the vehicle. The upper end of the support 4 is provided with a saddle 5 having upturned ends 6 adapted to straddle the axle and hold the same upon the saddle. In instances where the axle, or other available portion of the vehicle, is relatively low, the toe 7, carried adjacent the lower end of the support, is utilized in the manner illustrated.

In order to provide for the automatic adjustment of the support 4, to the height of the vehicle, a contractile spring 8 is employed, the same being housed within the channel of the standard 1, and having one end secured to the pin 9 carried thereby and its opposite end connected with an offset lug 10 carried by the support 4.

From the foregoing, it will be obvious that the tendency of the spring 8 is to urge the support 4 into projected position. Thus, in operation, as the support is placed under the axle A, indicated in dotted lines, the contractile spring will project the support to engage the same. To lock the support against retraction on the standard 1, a pivotal dog 11, carried by the support, frictionally engages the inner face of the channel. Obviously, while the load upon the support 4, will tend to force the dog into engagement with the standard, the locking action of the dog is further provided for by a handle 12 having an end socket 13 for reception of the end of the dog.

The handle 12 permits the dog to be manually forced into locking engagement and thereafter the weight of the handle tends to hold the dog in that position. Further, in addition to actuating the dog, the handle 12 facilitates the positioning of the support under the vehicle.

While the structure thus far described, provides for the automatic adjustment of the support 4 to the height of the vehicle, it will be appreciated that the amount of adjustment thus obtained, must be more or less limited by the length of operation of the spring 8. Therefore, in instances where further adjustment is required, and to supplement the action of the spring 8, a leg 14 is hinged adjacent its upper end to the support 4 and is provided at its lower end with a pivoted shoe 15 similar in construction to the shoe 2.

A contractile spring 16, connecting the leg 14 with the standard 1, tends to retract these members which will raise the support 4 independent of the action of the spring 8. A toothed link 17, pivotally connected with the standard 1, and engaging the lower edge of the slot 18 provided in the leg 14, serves to lock the leg and standard in adjusted retracted position.

In some instances, it may be desired to eliminate the link 17, due to the fact that the same may not be as readily collapsed as desired. In such case, the toothed bar 19 connected by a chain 20 with the standard 1, may be employed.

In operation, the bar 19 is positioned in the slot 18 and engages the lower end thereof in a manner similar to the link 17. A chain 21 connected to the bar 19 and provided with a handle 22 facilitates manipulation of the bar 19.

In operation, the support is positioned under a vehicle with the leg 14 and standard 1 spread to the maximum distance and the support 4 is forced to its retracted position on the standard 1 by means of the handle 12. When the support has been properly positioned, the dog 11 is released by a slight upward movement of the handle 12, and the support is then projected through the action of the spring 8. Simultaneously with the foregoing operation, the spring 16 will cause the leg 14 and standard 1 to be retracted, which further supplements the adjusting action of the support 4. Obviously, when the load is received upon the support, the dog is forced into locking engagement, and the link 17 locks the leg 14 and support 1 against spreading.

From the foregoing, it will be readily seen that a highly efficient and practical support has been provided, which may be quickly adjusted to any desired height and which provides a ground engaging base of sufficient length to prevent tilting of the support, and its submergence in soft ground.

In instances where the amount of adjustment of the support 4 is sufficient, the hinged leg 14 may be entirely eliminated and the standard 1 swung to vertical position and locked therein by the hook 23, which is pivotally carried by the shoe 2 and engages the pins 24, connecting the spring 16 with the standard 1.

In addition to providing for the automatic adjustment of the support to the desired height, it will be further appreciated that the complete collapsibility of the device, together with that of the pivotal shoe, enables the same to be stored in an exceedingly compact space.

I claim:

1. A vehicle support comprising a pair of telescopic members, means for urging said members apart, a leg hinged to one of said members, a spring for retracting said leg, means for locking said telescopic members against retraction, and means for locking said leg against spreading.

2. A vehicle support comprising a standard of channel construction, a shoe pivotally carried by the lower end of said standard, a supporting head slidably mounted upon the upper end of said standard, a contractile spring positioned within said head and connecting the same with said standard to urge the same to projected position, a dog pivotally carried by said head and engaging said standard within the channel, and means for locking said standard in vertical position on said shoe.

3. A vehicle support comprising a pair of telescopic members, one of said members being of channel construction, a shoe pivoted to the lower end of said channel member, a spring positioned within said channel member and connecting the same with the other telescoping member to normally urge the same to projected position, a pivotal dog carried by one of said members for engaging said channel member within its channel to lock said members against retraction, a leg hinged to one of said members at its upper end, a shoe pivotally carried by said leg at its lower end, a spring connecting said leg with said channel member to cause retraction of the same, and a toothed link carried by said channel member and engaging said leg to prevent spreading.

4. A vehicle support comprising a pair of telescopic members, means for urging said members apart, a leg hinged to one of said members, a spring for retracting said leg, means for locking said telescopic members against retraction, and means for locking said leg against spreading, including a toothed link pivotally connected to one of said telescopic members and adjustably engaging the leg.

In testimony that I claim the foregoing I have hereunto set my hand at Milwaukee, in the county of Milwaukee and State of Wisconsin.

MAURICE C. PIERCE.